United States Patent [19]

Rutz et al.

[11] Patent Number: 5,084,949
[45] Date of Patent: Feb. 4, 1992

[54] TENTERING CHAIN WITH A CONTINUOUSLY ADJUSTABLE CHAIN PITCH FOR TREATING FILM WEBS SIMULTANEOUSLY IN TWO AXIAL DIRECTIONS

[75] Inventors: Andreas Rutz, Lindau; Rudolf Langer, Bodolz; Hubert Becher, Tettnang; Klaus Buttenbender, Friedrichshafen; Heinz Zeller, Weissensberg, all of Fed. Rep. of Germany

[73] Assignee: Lindauer Dornier GmbH, Lindau, Fed. Rep. of Germany

[21] Appl. No.: 614,637

[22] Filed: Nov. 14, 1990

[30] Foreign Application Priority Data

Nov. 14, 1989 [DE] Fed. Rep. of Germany ....... 3937829
May 12, 1990 [DE] Fed. Rep. of Germany ....... 4015309

[51] Int. Cl.⁵ .................................................. D06C 3/02
[52] U.S. Cl. ........................................ 26/72; 26/89; 26/93
[58] Field of Search ............... 26/72, 93, 89, 71, 93, 26/91, 73

[56] References Cited

U.S. PATENT DOCUMENTS

| | | | |
|---|---|---|---|
| 2,728,941 | 1/1956 | Alles et al. | 26/72 |
| 3,611,479 | 10/1971 | Wicksall | 26/72 |
| 3,765,067 | 10/1973 | Fisher | 26/72 |
| 3,916,491 | 11/1975 | Kampf | 26/72 |
| 4,614,011 | 9/1986 | Nicholas et al. | 26/73 |
| 4,882,820 | 11/1989 | MacKinnon et al. | 26/93 |
| 4,890,365 | 1/1990 | Langer | 26/73 |

*Primary Examiner*—Werner H. Schroeder
*Assistant Examiner*—Amy Brooke Vanatta
*Attorney, Agent, or Firm*—W. G. Fasse

[57] ABSTRACT

A tentering chain has a continuously adjustable chain pitch for the simultaneous biaxial treatment of film webs. Tenter bodies conventionally equipped with clamps or hooks for gripping an edge of the film web are carried by the tentering chain. Guide rails operate the tenter clamps. Neighboring tenter bodies are interconnected by chain links. Each chain link is connected by a hinging connection at each end to the respective tenter body. At least one of the two hinging connections of a chain link is adjustable by a hinging bolt having an eccentric section or sections and a circular section or sections. The adjustable eccentric hinging bolts are mounted for rotation in the tenter bodies and the eccentric section engages the respective end of the chain link. For this purpose the chain link has a bore in which the eccentric section is received. However, the eccentric sections could also be mounted in side walls of the tenter body while the circular section is received in a through bore of the respective chain link.

13 Claims, 10 Drawing Sheets

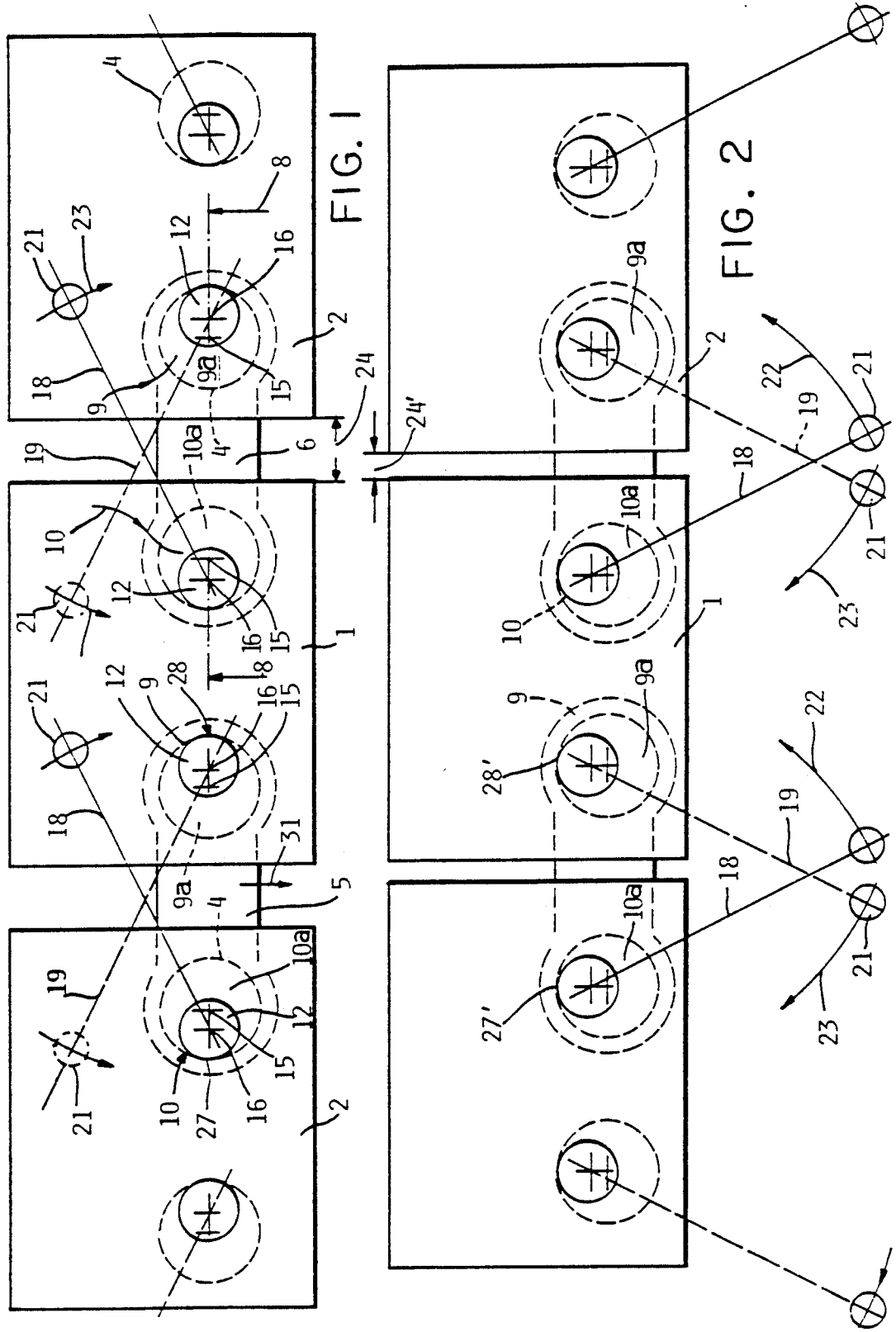

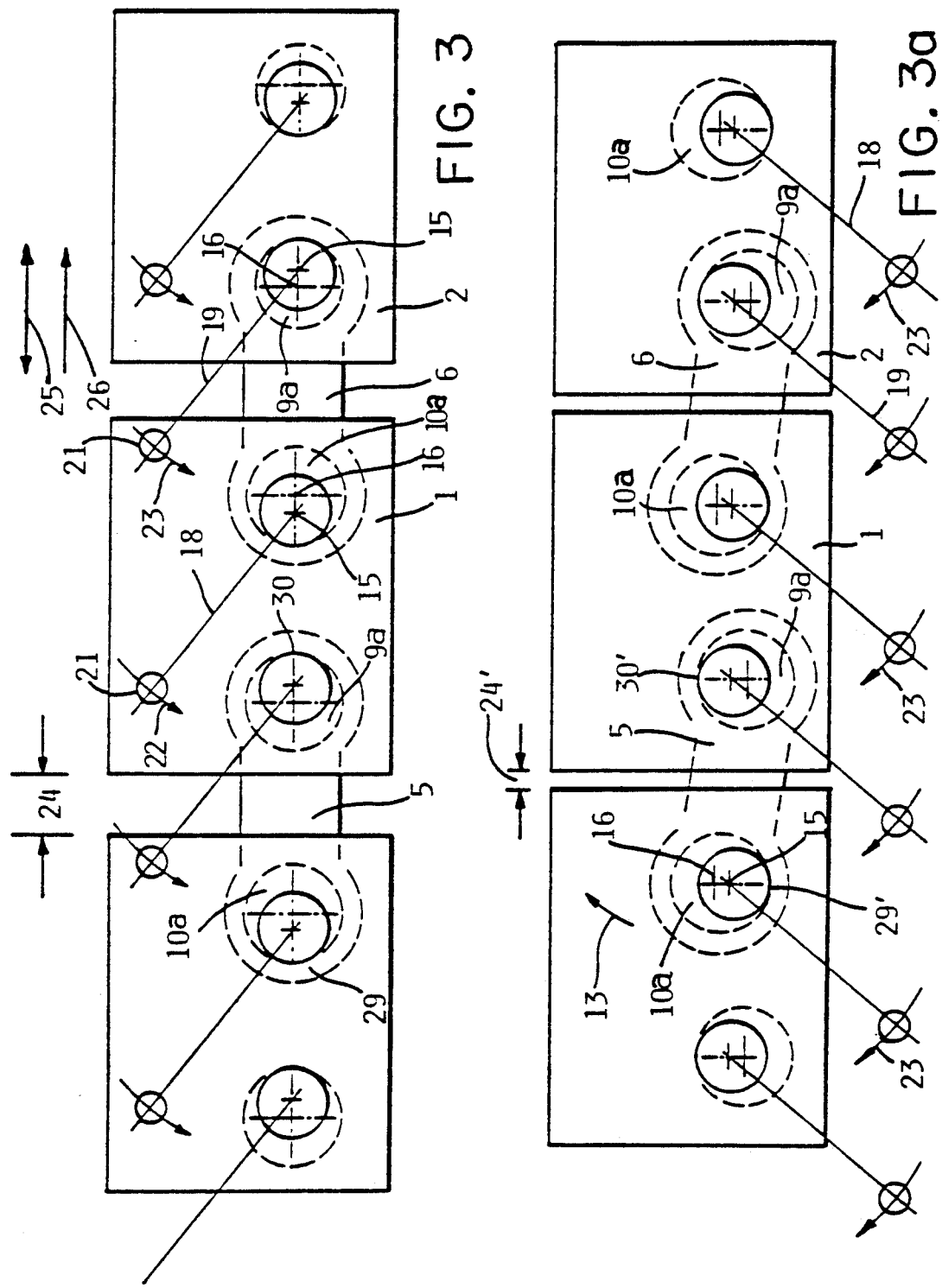

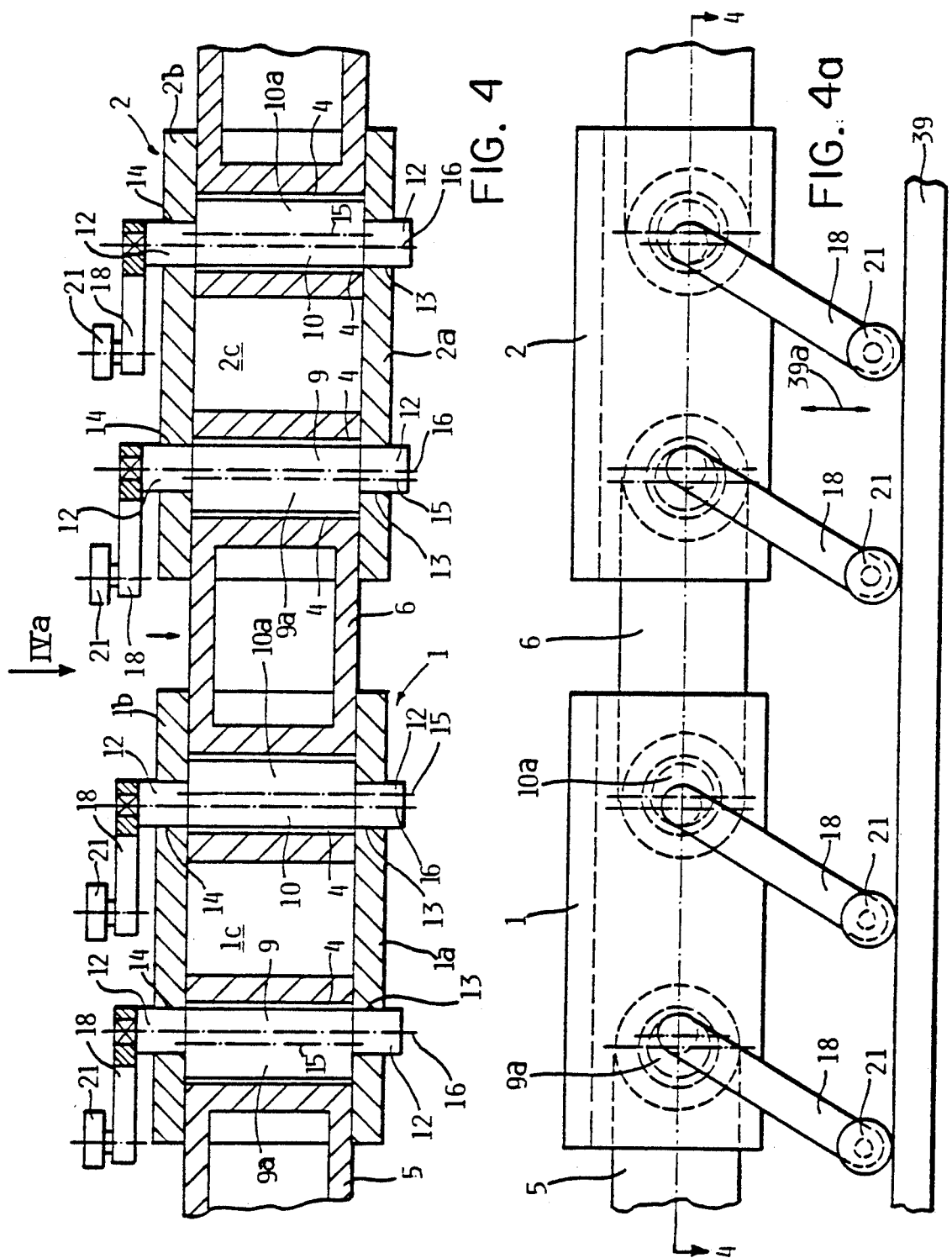

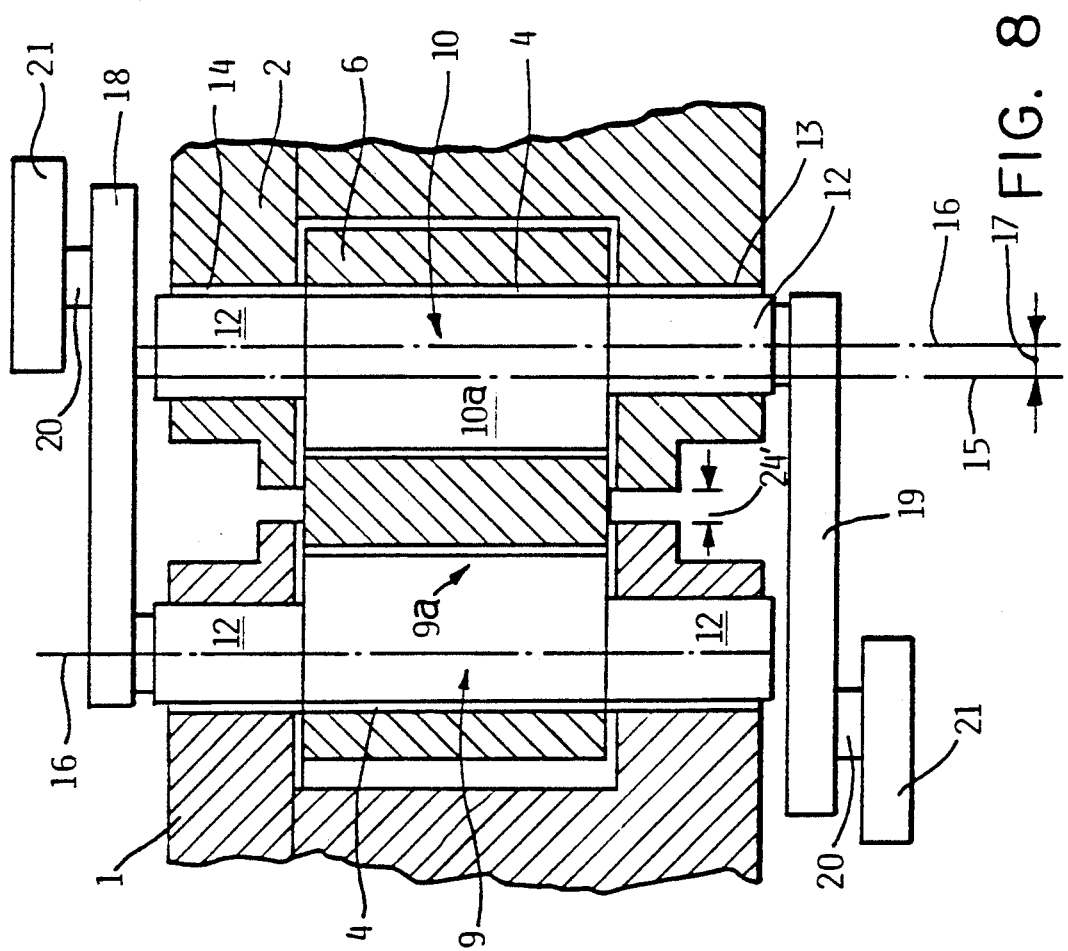

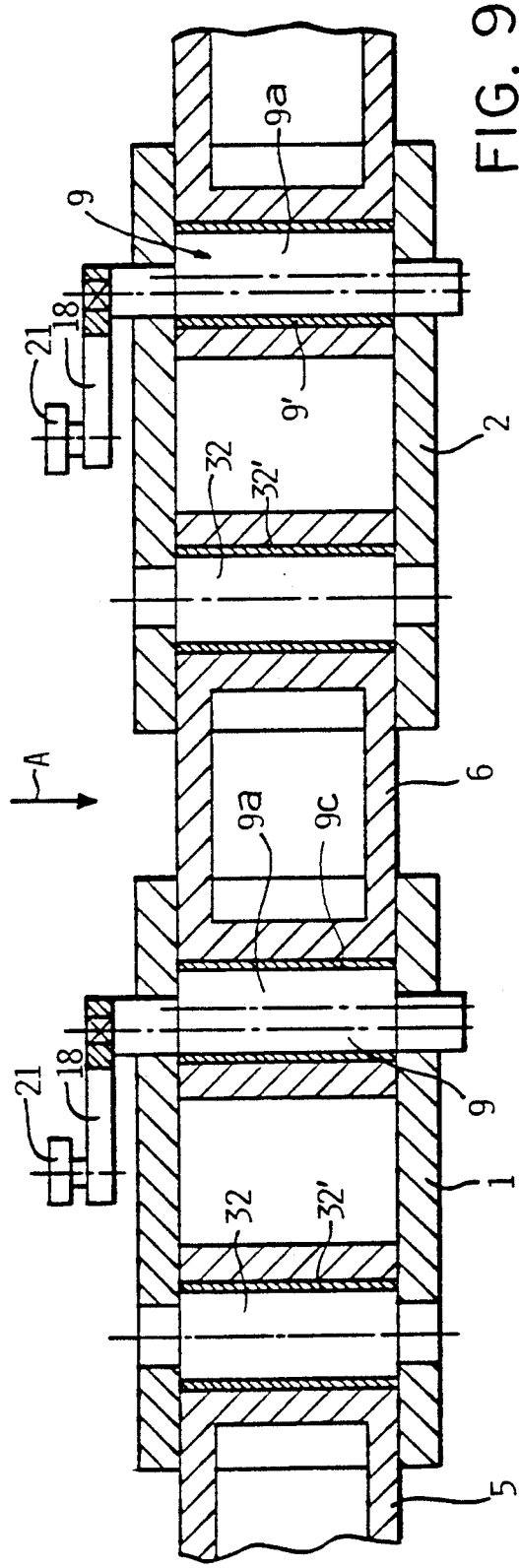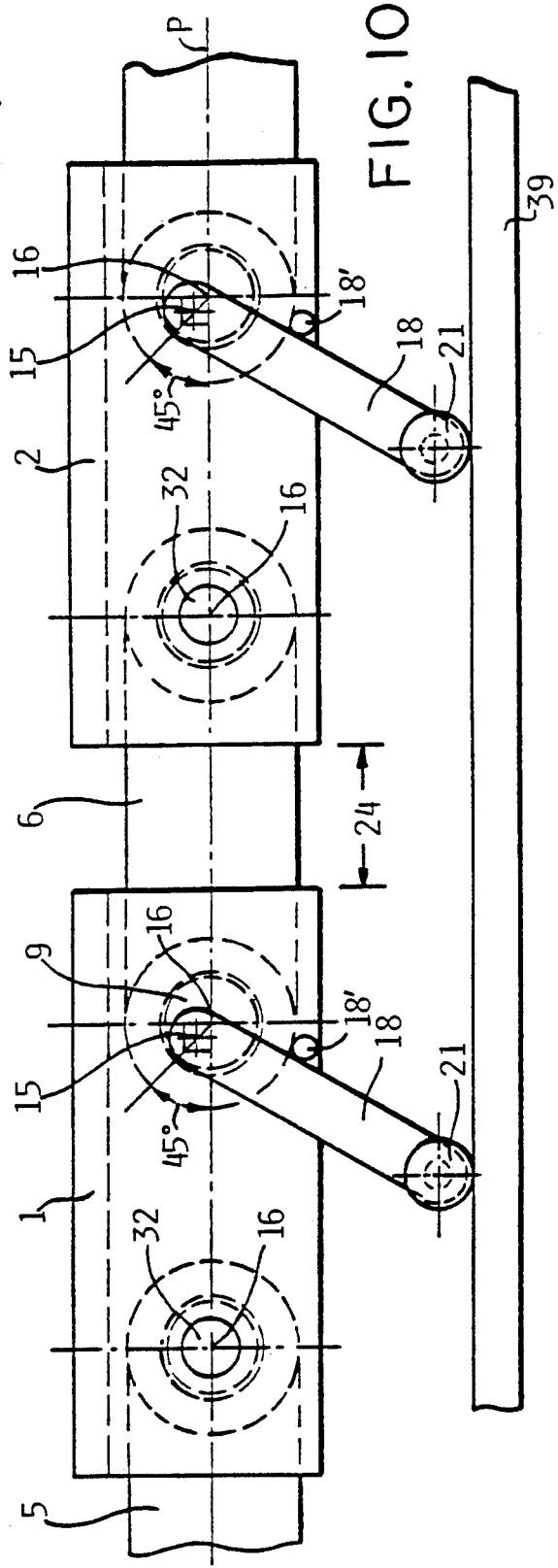

TENTERING CHAIN WITH A CONTINUOUSLY ADJUSTABLE CHAIN PITCH FOR TREATING FILM WEBS SIMULTANEOUSLY IN TWO AXIAL DIRECTIONS

FIELD OF THE INVENTION

The invention relates to tentering chains having a continuously adjustable chain pitch. Such tentering chains are used, for example, in systems for the simultaneous biaxial treatment of synthetic material films. For this purpose the chains carry tentering clamps or hooks for gripping the edges of a film.

BACKGROUND INFORMATION

In systems of the above type the tentering chains carry tenter bodies which in turn support the above mentioned tentering hooks or clamps. Additionally, the tenter bodies carry guide rollers which run along guide surfaces of the guide rails of the system. The tenter bodies are pivoted to the chain links and it is desirable that the chain pitch is adjustable. The term "chain pitch" in this context means the on-center spacing between two chain bolts that journal neighboring chain links and tenter bodies to each other.

Two systems are known for the stretching of synthetic material films. One system involves stretching the film separately in the longitudinal direction and then stretching the film separately in the crosswise direction, whereby the two stretching operations take place sequentially in a two-stage operation. In such a system it is not possible to change the pitch of the chain subsequent to the crosswise stretching.

The second of the above two mentioned systems involves the simultaneous stretching of the film in the longitudinal direction and in the crosswise direction. During the stretching operation the longitudinal stretching involves stretching steps corresponding to a multiple of the chain pitch.

In both conventional systems it is desirable to apply a controlled shrinking to the stretched foil to stabilize the synthetic material of the foil. The controlled shrinking is accomplished in the crosswise direction by guiding the tentering chains along tracks that converge subsequent to the crosswise stretching. The shrinking in the longitudinal direction can be accomplished in a system equipped with tentering chains as disclosed in U.S. Pat. No. 4,890,365 (Langer), corresponding to German Patent (DE) 3,716,603, disclosing a stepless or continuously adjustable chain pitch by means of bellcranks which interconnect neighboring chain links, whereby means are provided for adjusting the tilting of the bellcranks. However, such tilting of the bellcranks is limited so that the chain pitch can only be changed up to about 1.5% of the normal chain pitch.

OBJECTS OF THE INVENTION

In view of the above it is the aim of the invention to achieve the following objects singly or in combination:

to provide a tentering chain in which the chain pitch can be controlled or modified within a larger range than is possible by the prior art so as to permit for a larger shrinking factor;

to provide for chain pitch changes and hence for respective shrinking factors in a range larger than 2% and preferably up to 10% of the normal chain pitch;

to use an eccentric adjustment bolt for changing the chain pitch;

to construct a tentering chain in such a way that the chain pitch can be all together smaller than is possible in the prior art to thereby achieve a more compact structure; and to make the chain links smaller to thereby also permit a smaller tenter body which in turn will reduce the spacing between the gripping edge of a film and the chain pivot point.

SUMMARY OF THE INVENTION

A tentering chain according to the invention is characterized in that a tenter body and a chain link are interconnected by a position adjustable hinging bolt which has eccentric means and circular means positioned for displacing said tenter body and said chain link relative to each other in a longitudinal chain direction while maintaining an operational interconnection between the tenter body and the respective chain link.

In one embodiment the circular means of the hinging bolt are formed by two coaxial circular end sections of the bolt and the eccentric means are formed by an eccentric central section of the bolt located between the circular end sections. In another embodiment the hinging bolt has two eccentric end sections forming the eccentric means and a circular central section forming the circular means between the eccentric end sections. In still another embodiment the hinging bolt has an eccentric section and a circular section. In all embodiments either the circular means or the eccentric means engages the tenter body or the chain link or vice versa. Further, in all embodiments an operating member is connected to the hinging bolt for adjusting the relative position of the hinging bolt.

It is not necessary that all hinging connections between the chain links and the tenter body of an endless tentering chain are formed by the above described adjustable hinging bolts. Some of the hinging bolts may be simple cylindrical hinging bolts. In any event, the load transmitting length of the chain links is variable by the rotational adjustment of the adjustable hinging bolts. As a result, the invention achieves the advantage that a tentering chain can be realized which has a variable pitch which additionally may be smaller than in conventional tentering chains. The pitch or on-center spacing between neighboring hinging bolts of the tentering chain may be smaller because no space is needed for bellcranks or the like. As a result, the invention achieves a more compact tentering chain which is stable even under stretched out load conditions. Therefore, the forces needed for changing the pitch are also smaller.

The interconnection of the chain links with the adjustable hinging bolts according to the invention makes it possible to obtain pitch changes within the range of 5 to 10% relative to a normal pitch. Accordingly, the shrinking factor is within the same range which is a substantial improvement over the above described prior art where the maximum shrinking value was 1.5%.

Another important advantage of the invention is seen in that due to the very large pitch adjustability and hence the achievable large shrinking value, it is now possible to use a system equipped with tentering chains according to the invention for a follow-up stretching of a film that has already been stretched.

Further, due to the more compact tenter body according to the invention, it is possible to also make the spacing between the film gripping edge and the chain hinging axis smaller. The chain hinging axis is the journal axis about which one chain link can tilt relative to a neighboring link. As a result, all structural components of the present tentering chain may be dimensioned smaller while they are still capable of taking up the same forces or loads due to the smaller spacing mentioned above, which causes smaller torque moments for the same forces.

As mentioned, the adjustable rotation of the adjustable hinging bolt is accomplished by an adjustment member or lever which is rigidly connected to one end of the adjustable hinging bolt. A free end of the adjustment lever carries a rotational roller which engages and rolls along a control rail. By changing the spacing between the control rail and the tenter body, the adjustment lever is tilted more or less, whereby the adjustable hinging bolt is correspondingly rotated to thereby change the pitch to either make it longer or shorter, so that the spacing between neighboring tenter bodies is also changed. As a result, the overall length of the tentering chain or its load transmitting run is correspondingly changed.

The arrangement of the adjustment lever can also be accomplished by several embodiments. More specifically, the adjustment levers of neighboring adjustable hinging bolts can either be turned in opposite directions, or in the same direction. The arrangement with adjustment levers turnable in opposite directions has the advantage that the resulting chain tension is in the same direction as the running direction of the chains and thus of the film. The change in the load transmitting length of the chain takes place by a parallel displacement, so to speak, of the chain links, whereby one adjustment lever turns clockwise, while the other adjustment lever turns counterclockwise. Thus, it could be said that one lever turns approximately in the travel direction of the tentering chain, while the other turns in the opposite direction to the travel direction.

In the embodiment in which the adjustment levers turn in the same direction, the chain links are caused to slant relative to the horizontal travel direction of the tentering chain, whereby a larger pitch adjustment range is achievable and hence also a larger shrinking measuring or factor within the range of 7 to 10%.

So far it has been assumed that the tentering chain system is stable in its stretched-out condition because the adjustable eccentric hinging bolts bear with their oppositely facing outer sides against the respective receiving bores in the chain link, whereby it is further assumed that the eccentric section of the hinging bolt is either in the same direction or in opposite directions. If this type of adjustment is plotted as a sine curve, the effectiveness of the adjustment takes place in the relatively flat portion near the peak of the sine curve. As a result, relatively large angular movements are required for the adjustment of the adjustable hinging pin in order to achieve respective longitudinal changes in the pitch.

The just mentioned relatively large angular adjustment movement can be avoided according to a further embodiment of the invention in which the adjustable hinging bolts are so positioned that their eccentric sections face in diametrically opposite directions. The construction is such that the eccentric axes of the hinging bolts having an eccentric section are displaced out of a horizontal plane defined by the centric hinging axes of the hinging bolts, whereby the rotation angle of the eccentric section about the respective displaced eccentric axis can be smaller for the pitch adjustment, as compared to the embodiment in which all hinging axes are located in the same horizontal plane. The reduced adjustment angle may, for example, be 45° to achieve a diametrically opposite position of the eccentric hinging bolt sections. Thus, an optimal displacement with a minimal angular rotation of the eccentric sections is achieved for changing the pitch since the adjustment takes place in the steeper rising portion of the sine curve. The rotation of the eccentric sections can take place in the same direction, or in opposite directions. In any event, the adjustment levers travel with the tentering chain, whereby the rollers at the free ends of the adjustment levers travel along guide tracks which assures a reliable and safe operation.

Instead of using an adjustable hinging bolt with an eccentric section or sections, it is possible to use a cylindrical hinging bolt supported in an eccentric bushing or bushings, each of which is also provided with a respective adjustment lever connected to its axially facing bushing end.

Instead of an adjustment lever, it is possible to drive the adjustable hinging bolt or the adjustable bushing with a pinion gear drive, whereby at least one free end of the hinging bolt or bushing is rigidly connected to a gear wheel and the gear wheels of two bolts or bushings mesh with a further gear wheel or a double-toothed rack. The further gear wheel is connected to an adjustment lever, the rotational axis of which is rigidly connected to the respective tenter body. The free end of the lever also has a roller which runs along a position adjustable guide rail. Where the adjustment is accomplished by means of a double toothed rack, the free end of the rack also cooperates with a guide rail.

For this purpose the free end of the toothed rack is also provided with a roller that contacts sequentially two oppositely inclined guide surfaces of respective guide tracks arranged along side the track of the tentering chain. One guide rail moves the toothed rack, the other guide rail moves the toothed rack down again.

All embodiments according to the invention permit a substantially more compact construction of the individual tenter bodies, for example, the above mentioned spacing between the edge of the film to be stretched and the hinging axis of the tentering clamp or hook is within the range of 80 to 90 mm. Contrary thereto according to the invention this spacing is merely within the range of 45 to 50 mm. As a result, the same forces cause smaller bending or torque moments so that all components of the tentering chain can have smaller dimensions according to the invention.

BRIEF FIGURE DESCRIPTION

In order that the invention may be clearly understood, it will now be described, by way of example, with reference to the accompanying drawings, wherein:

FIG. 1 is a schematic side view of a tentering chain according to the invention illustrating a first embodiment of the invention in its starting position with a maximum spacing between neighboring tenter bodies and thus with a maximum pitch;

FIG. 2 is a view similar to that of FIG. 1, however, with a reduced pitch so that the spacing between neighboring tenter bodies is smaller than in FIG. 1;

FIG. 3 is a side view of a second embodiment similar to that of FIG. 1 showing a starting position in which the spacing between neighboring tenter bodies is largest, and whereby adjustment levers extend upwardly;

FIG. 3a is a view similar to that of FIG. 3, but showing an adjusted position in which the spacing between neighboring tenter bodies has been reduced by tilting the adjustment levers downwardly for slanting the chain links;

FIG. 4 is a sectional view through an embodiment as in FIGS. 3 and 3a, but showing the adjustment levers and their cooperation with a guide rail for the lever adjustment whereby the section plane 4—4 is shown in FIG. 4a;

FIG. 4a is a side view in the direction of the IVa in FIG. 4;

FIG. 8 is a sectional view, on an enlarged scale, along section line 8—8 in FIG. 1;

FIG. 9 is a sectional view similar to that of FIG. 4, however, illustrating an embodiment in which there is only one adjustable eccentric hinging bolt for each tenter body and each chain link while the other hinging bolt is cylindrical;

FIG. 10 is a view in the direction of the arrow A in FIG. 9 showing that the eccentric hinging axis is displaced out of a plane defined by the journal axes of the cylindrical hinging bolts;

Figure 5:
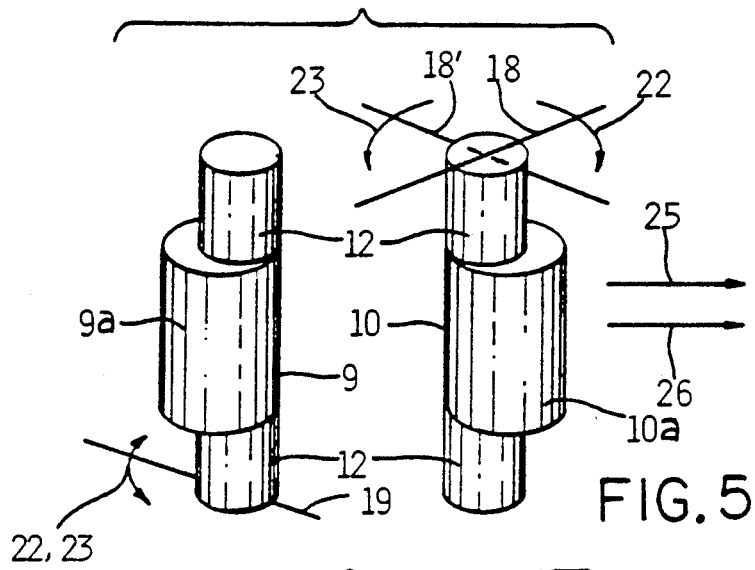
FIG. 5 is a perspective view of two neighboring adjustable hinging bolts shown in the position of FIG. 1, in the same tenter body providing the largest spacing or pitch.
Figure 6:
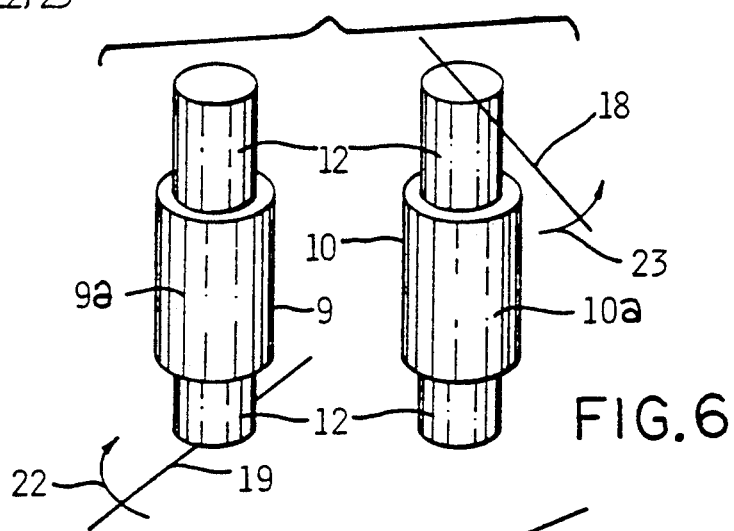
FIG. 6 is a view similar to that of FIG. 1, but showing two adjustable hinging bolts in the same tenter body in the position of FIG. 2 providing the smallest spacing or pitch.

DETAILED DESCRIPTION OF PREFERRED EXAMPLE EMBODIMENTS AND OF THE BEST MODE OF THE INVENTION

FIGS. 1 and 2 show a first embodiment of the invention in which tenter bodies 1, 2 are interconnected with chain links 5, 6 by position adjustable means, such as a position adjustable hinging bolt 9, 10 which has an eccentric section 9a, 10a or sections and circular sections 12 or a circular section positioned for displacing the tenter body and the respective chain link relative to each other for changing the effective length of the chain while maintaining an operational interconnection between the tenter body and the respective chain link. Thus, according to the invention, the effective chain pitch is adjustable and thus, the spacing 24 between neighboring tentering bodies 1, 2 is also adjustable. The reduced spacing 24' is shown in FIG. 2.

Referring to FIGS. 1, 2, and 3a in conjunction, the tentering bodies 1, 2 have side walls 1a, 1b, and 2a, 2b respectively. Axially aligned bores 13, 14 pass through these side walls 1a, 1b, 2a, 2b. These bores are aligned relative to the longitudinal axis 16. Position adjustable hinging bolts 9, 10 having respective eccentric sections 9a and 10a and circular end stubs 12, as best seen in FIG. 5, are used for the adjustment of the spacing 24, 24'. For this purpose, the eccentric sections 9a and 10a are received in bores 4 passing through the respective chain link 5, 6. The bores 4 have a rotational axis 15. The end stubs 12 of the adjustable hinging bolts 9, 10 are received in the axially aligned bores 13, 14 in the respective side walls 1a, 1b, and 2a, 2b of the tentering bodies 1, 2. Each hinging bolt 9, 10 is rotatable about the axis 16 by means of an adjustment lever 18, one end of which is rigidly connected to the stub end 12, while the other end carries a roller 21 rotatably secured to the free end of the adjustment levers 18 for engaging a guide track 39 shown in FIG. 4a to be described below.

The chain pitch and thus the spacing 24, 24' is adjusted by rotating the lever 18 and thus shifting the respective eccenter portion 9a, 10a in the respective bores 4. As a result, the respective chain link 5, 6 is pulled more or less into the free spaces 1c, 2c of the corresponding tenter bodies 1 or 2.

Referring to FIG. 8, the range of adjustment 17 is determined by the instantaneous spacing between the axis 16 which is the rotational axis of the end stubs 12 and the axis 15 which is the central axis of the bore 4 in the respective chain link 5 or 6. Thus, by dimensioning the components participating in the adjustment, especially the bores 4, and the eccenter sections 9a and 10a, it is possible to determine the extent of the adjustment 17, and thus of the spacings 24, 24'.

All the adjustment levers 18 with their rollers 21 may be arranged on one side of the tentering chain as shown in FIG. 3a, for example. However, it is also possible to arrange one set of adjustment levers 18 on one side and another set of adjustment levers 19 on the other side as shown in FIG. 8. In both instances, the rollers 21 will be rotatably secured to an axle 20 which is rigidly secured to the respective adjustment lever 18, 19 which in turn is connected to its end stub 12 in a rigid manner. FIG. 4a shows how the rollers 21 engage a guide surface of a guide rail 39 which is movable back and forth in the direction of the arrow 39a to make the above mentioned adjustments. Normally, if the guide rail 39 is in a position permitting the widest possible spacing 24 between neighboring tentering bodies 1, 2, the pull on the tentering chain will tend to establish this condition. On the other hand, the rail 39 can be forced, for example, by a piston cylinder device, into a position in which the eccenter sections 9a and 10a take up their chain length reducing position.

Referring to FIGS. 1, 2, and 5 and 6 in conjunction, two different positions of the eccenter sections 9a, 10a of the adjustment means 9, 10 will now be described. The two adjustment levers 18 and 19 for adjusting the position of the eccenter section 9a, 10a respectively, are rotated in opposite directions as indicated by the arrows 22, 23. As shown in FIGS. 1 and 5, the eccenter sections 9a, 10a in the body 1 face in opposite directions away from each other along the length of the tentering chain which moves in the direction of the arrow 25, thereby establishing the spacing 24. On the other hand, in FIGS. 2 and 6, the eccentric sections 9a and 10a face in the same direction, downwardly in FIG. 2 and toward the viewer in FIG. 6. More specifically, in FIG. 2, the backs 27' and 28' face upwardly while the eccentric sections 9a and 10a face downwardly, thereby reducing the spacing between neighboring tenter bodies 1, 2 as shown at 24'. The just mentioned adjustment causes the chain links 5, 6 to move downwardly as indicated by the arrows 31 in FIG. 1, and as shown in FIG. 2. The bearing lines 27, 28 shown in FIG. 1 travel, as a result of the adjustment, into the positions 27', 28' whereby the shift indicated by the arrow 31 takes place as described for reducing the spacing 24 to the spacing 24'.

FIG. 5 also shows with an arrow 26 the travel direction of the foil which moves in the same direction as the travel direction 25 of the tentering chain.

Figure 7:
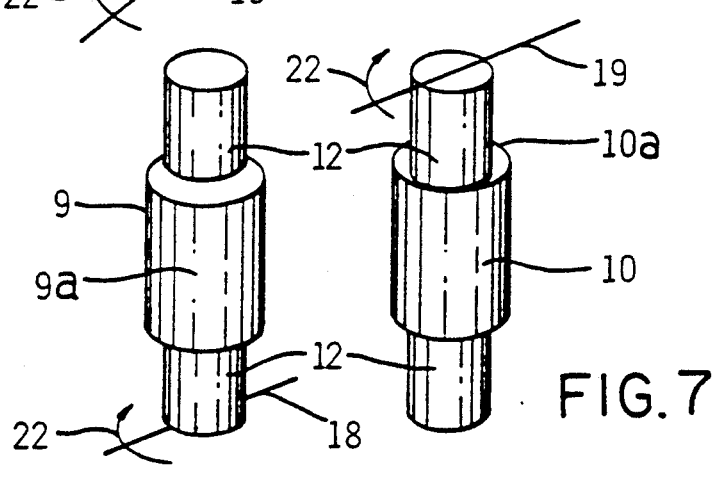
FIG. 7 shows two adjustable hinging bolts illustrated in the position they have assumed in FIG. 3a showing the smallest spacing or pitch between neighboring tenter bodies.

FIGS. 3, 4, and 7 illustrate a modification in which the adjustment levers are so arranged that all levers 18 and 19 can move counterclockwise as indicated at 22 in FIG. 3 or they can move clockwise as indicated at 23 in FIG. 4. The counterclockwise rotation of the levers 18 and 19 is applied to shorten the spacing between neighboring tenter bodies 1 and 2, whereby the bearing points 29 and 30 which are horizontally aligned in FIG. 3, move in opposite directions as shown in FIG. 4 at 29' and 30', in other words, one eccentric section, for example 10a, moves upwardly, while the other eccenter section 9a moves downwardly. When the horizontal orientation providing the widest spacing between neighboring tenter bodies is to be restored, the levers 18 and 19 move clockwise to return the chain links 5 and 6 to the positions shown in FIG. 3. Thus, counterclockwise adjustment of the levers 18 and 19 provides the spacing 24' while clockwise adjustment of these levers 18 and 19 restores the spacing 24.

FIG. 7 illustrates the position of the hinging bolts 9 and 10 corresponding to their position in FIG. 4. Thus, the eccentric section 10a which faces upwardly in FIG. 4, away from the viewer in FIG. 7. Similarly, the eccentric section 9a which faces downwardly in FIG. 4 faces toward the viewer in FIG. 7.

Arranging all adjustment levers 18 and 19 on one side may require the least space. However, where a more symmetric arrangement is desired or preferred, the levers 18 and 19 will be secured to the respective stub end of the corresponding hinging bolt 9 and 10 at diametrically opposite locations as shown in FIG. 8, which provides a more balanced load application.

For properly mounting the hinging bolts 9 and 10, it is preferred to divide the tenter bodies 1 and 2. For this purpose, one or both of the side plates 1a, 1b, and 2a, 2b may be separate components that are screwed to the tenter body after the adjustable hinging bolts 9, 10 have been inserted.

Further, the eccentric sections 9a, 10a, do not need to be solid bodies. Instead, these eccentric sections can be replaced by a crank arm or two crank arms. The effect would be the same and the structure of the eccentric adjustment means would be comparable to a crankshaft.

FIGS. 9 and 10 show a modified embodiment of the invention in which each tenter body 1 and 2 is provided with but one adjustable eccentric hinging bolt 9 while the other hinging bolt 32 is cylindrical. The cylindrical bolt 32 may be enclosed by an anti-friction bushing 32'. Similarly, the eccentric adjustable hinging bolt 9 may also be surrounded by an anti-friction bushing 9', at least where its eccentric section 9a bears against the respective bore surface in the chain link. As shown in FIG. 10, stops 18' may be provided on the tenter bodies 1, 2, to limit the maximum angular movement of the adjustment levers 18 for maintaining the widest possible spacing 24 between neighboring tenter bodies 1, 2. The stops 18' also reduce the load on the adjustment guide rail 39. The embodiment shown in FIGS. 9 and 10 allows for a shorter total adjustment angular range of about 45° compared to the embodiments described above requiring more than 45° the angular adjustment movement. In FIG. 10 the eccentric axes 15 are located outside the plane P defined by the centric hinging axes 16. The eccentric hinging axes 15 are located on a line extending at 45° to said plane P and through the respective centric axes 16. This displacement of the eccentric axes 15 has the advantage of a smaller angular adjustment movement. However, the adjustment range available by using but one eccentric adjustment hinging bolt for each tenter body, may be quite adequate for many applications. Additionally, the structure of FIGS. 9 and 10 is less expensive, and can be more compact, because of the use of but one eccentric adjustment hinging bolt for each tenter body.

Figure 11:
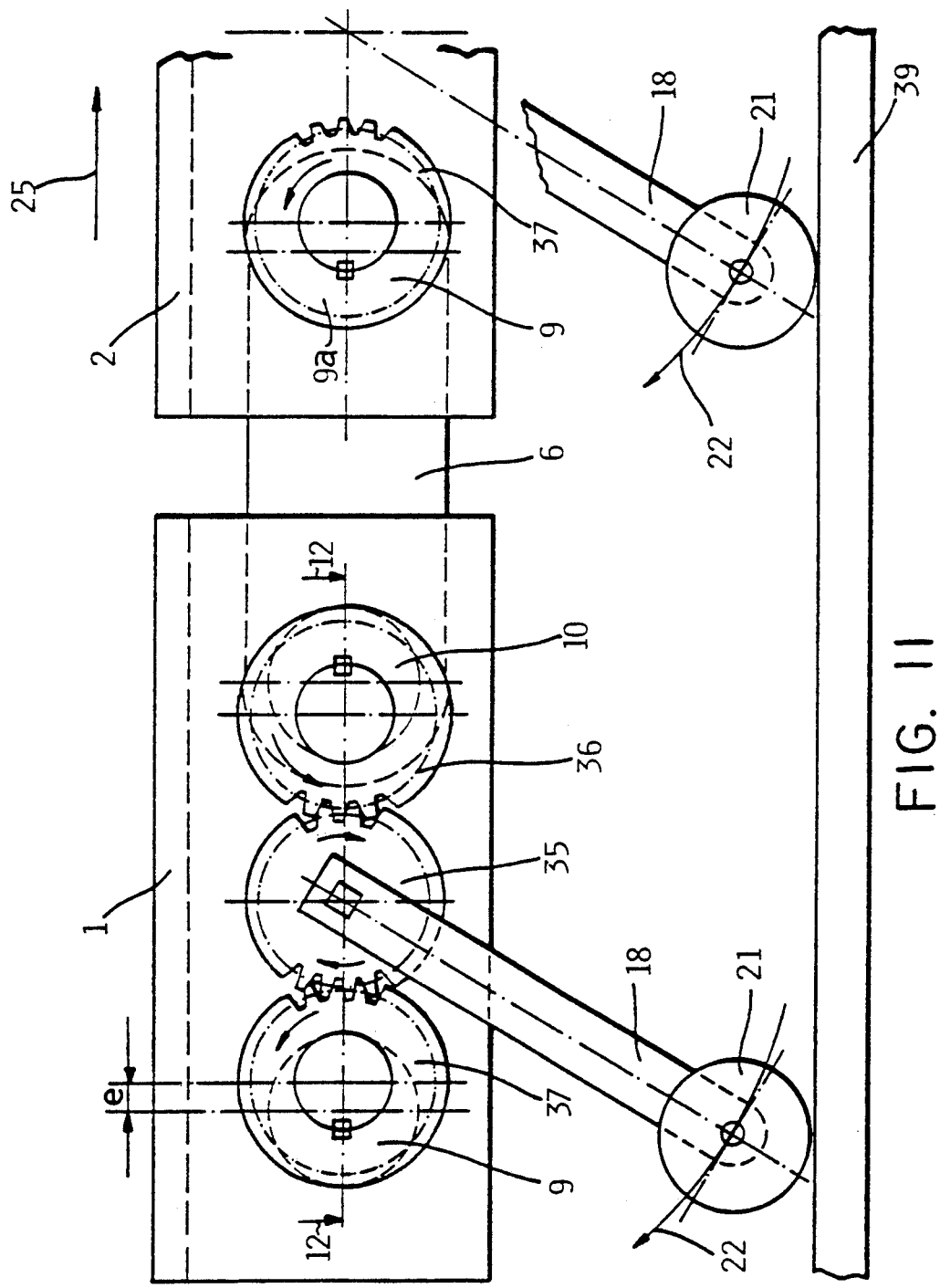
FIG. 11 is a side view of another embodiment in which the adjustable hinging bolts are adjustable by means of intermeshing gear wheels.
Figure 12:
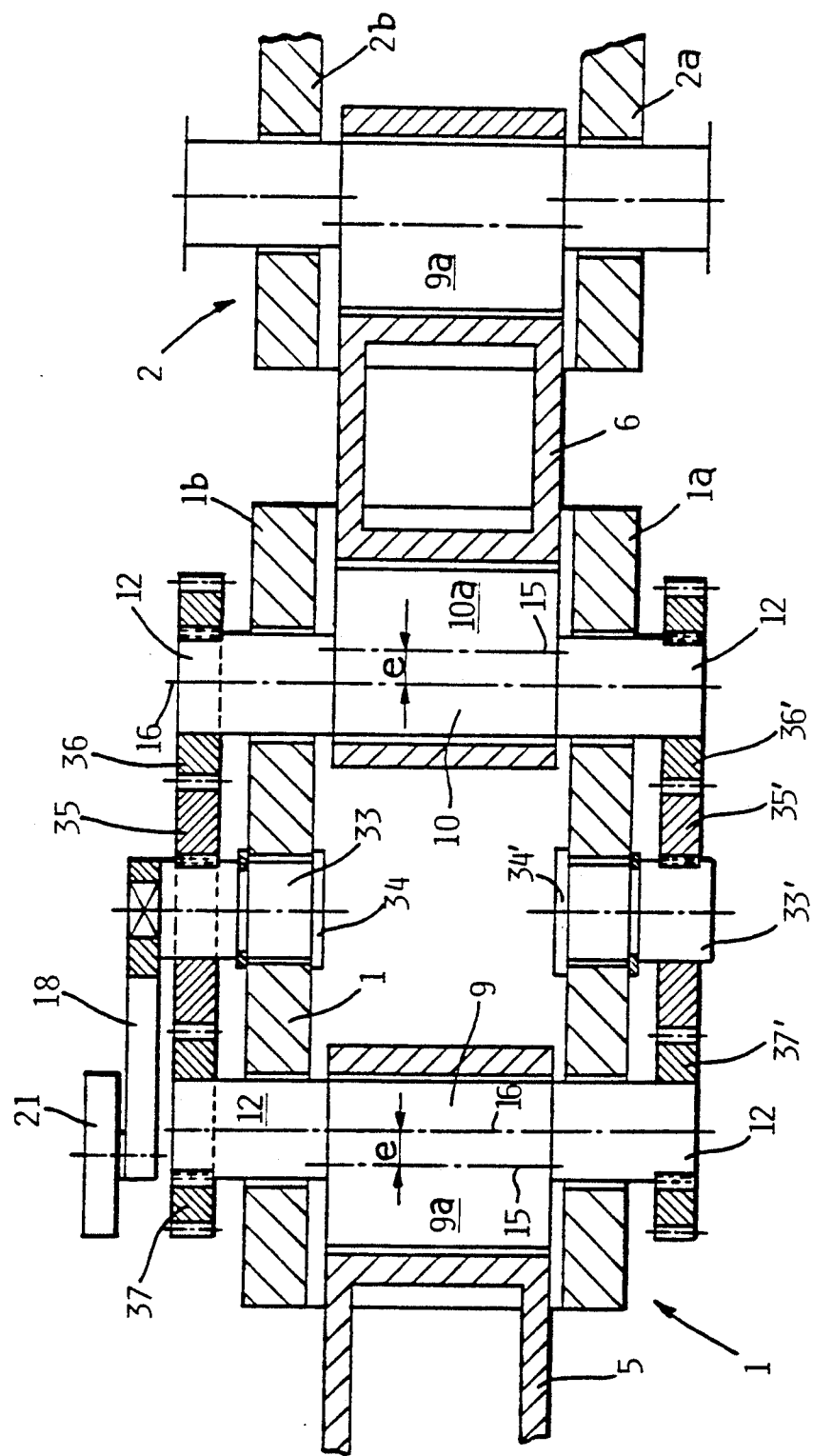
FIG. 12 is a sectional view along section line 12—12 in FIG. 11.

FIGS. 11 and 12 illustrate a modified embodiment for adjusting the position of the adjustable hinging bolts and their eccentric sections, whereby the structure requires only one adjustment lever 18 for rotating two neighboring hinging bolts mounted in the same tenter body. The adjustment lever 18 is rigidly secured to an axle stub 33 rotatably mounted in a bearing bushing 34 which in turn is mounted in the side wall 1b of the tenter body 1. A first gear wheel or pinion 35 is rigidly secured to the axle stub 33 to rotate with the stub when the stub is turned by the adjustment lever 18. The ends 12 of the circular sections of the adjustable eccentric hinging bolts 9 and 10 project sufficiently out of the side wall 1a, 1b of the tenter housing 1 to carry gear wheels or pinions 36, 37 rigidly attached to the ends 12 in positions for meshing with the adjustment or drive pinion 35. The just described arrangement may also be provided mirror-symmetrically on the other side wall 1a as best seen in FIG. 12 with an axle stub 33' in a bearing bushing 34' carrying a pinion 35' meshing with further pinions 36' and 37'. However, the arrangement shown in FIG. 12 has the advantage that a uniform force transmission to the eccentric sections of the hinging bolts is assured and that a one-sided loading and thus jamming of the eccentric hinging bolt is avoided.

The adjustment is accomplished by rotating the levers 18 in the direction of the arrow 22 by moving the guide rail 39 closer to the tentering bodies, whereby the drive wheel 35 turns clockwise and both driven wheels 36 and 37 turn counterclockwise to achieve the same adjustment as is illustrated in FIG. 4. However, in FIGS. 11 and 12 only one adjustment lever 18 is required for each tenter body 1, 2.

Figure 13:
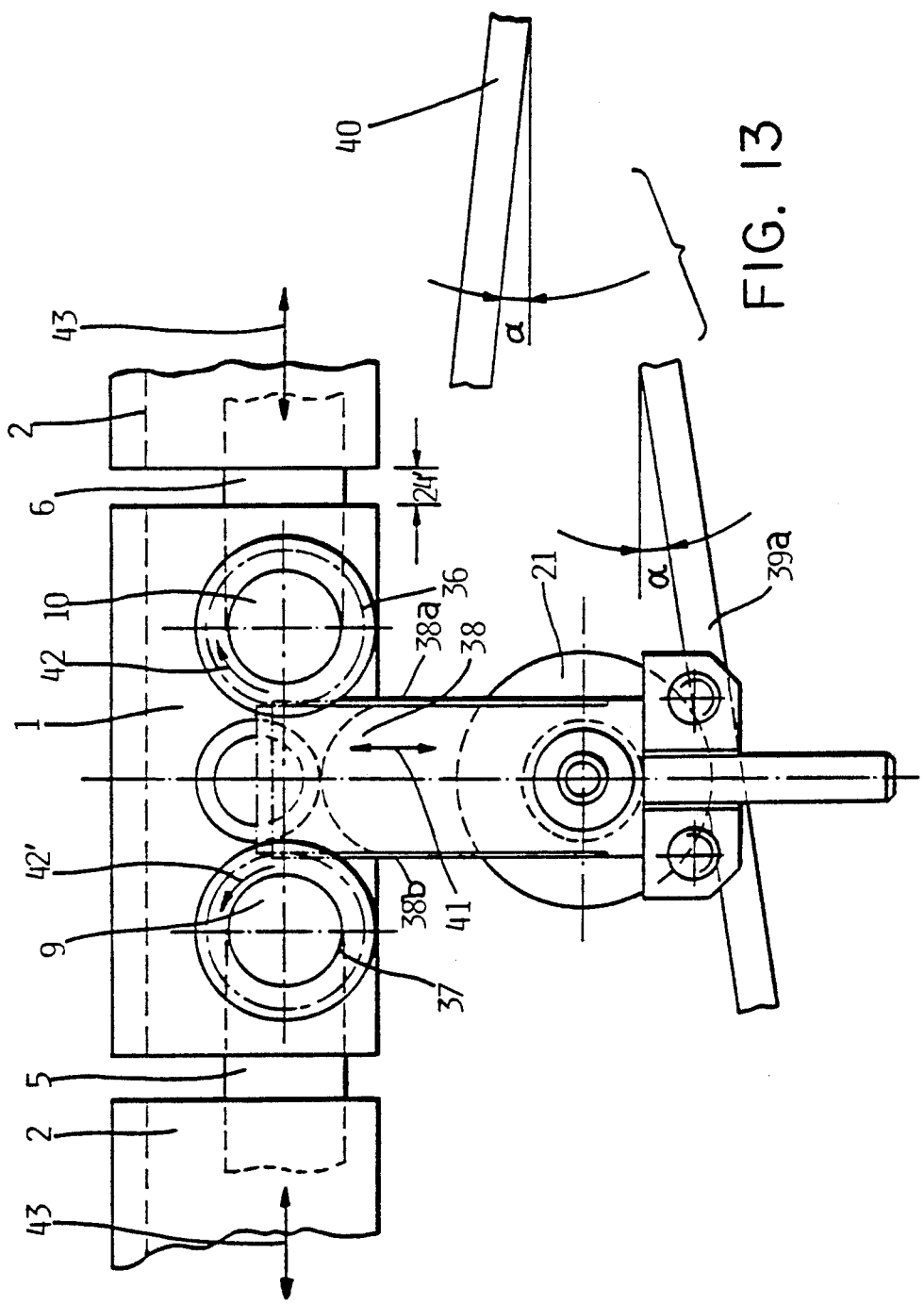
FIG. 13 is a view similar to that of FIG. 11, however, illustrating the adjustment of the hinging bolts with a pair of gear teeth and a double toothed rack that is movable up and down or back and forth.

FIG. 13 illustrates yet another drive for the adjustment of the eccentric, adjustable hinging bolts 9 and 10. Each of these bolts again carries a gear wheel 37 and 36 respectively. The eccentric sections 9a and 10a are not shown in FIG. 13. However, it is assumed that in the shown position of FIG. 13 the eccentric sections 9a and 10a face upwardly. In this position of the eccentric sections 9a, 10a the adjustment means in the form of toothed rack 38 does not yet engage the two pinions 36 and 37. The toothed rack has two rows of teeth 38a, 38b on opposite sides of the toothed rack 38. The row of teeth 38a engages the pinion 38 for the adjustment. The row of teeth 38b engages the pinion 37 for the adjustment.

The adjustment is accomplished by moving the toothed rack 38 up or down as indicated by the double arrow 41. The upward movement is controlled by a slanted guide rail 39a that includes an angle α with the horizontal. The downward movement is accomplished by a slanted guide rail 40 which also encloses an angle α with the horizontal but is slanted in a direction opposite to that of the guide rail 39a. When the toothed rack engages with its guide roller 21a the guide rail 39a, the toothed rack travels with the tenter body 1 and rises simultaneously due to the engagement of the guide rail 39a by the guide roller 21a, whereby the pinion 36 and thus the respective eccentric bolt 10 is rotated clockwise as indicated by the arrow 42. Simultaneously, the pinion 37 with its eccentric bolt 9 are rotated counterclockwise as indicated by the arrow 42'. As a result, the eccentric sections 9a, 10a are moved into the positions, for example, illustrated in FIG. 1, whereby the neighboring tenter bodies 1 and 2 are moved apart or away from each other as indicated by the arrows 43. When the roller 21a begins to engage the oppositely slanted guide rail 40, the toothed rack 38 now moves downwardly also indicated by the arrow 41. The rotation direction of the pinion 36 and 37 is now reversed and the tenter bodies 1 and 2 are moved closer again toward each other as shown in FIG. 13. The adjustment by means of a toothed rack 38 as described has the advantage that it permits a compact construction. Additionally, it avoids the slanting of the chain links 5, 6 as shown in FIG. 4.

The above mentioned angles α shown in FIG. 13 should be within the range of 0° to 45°.

Figure 14:
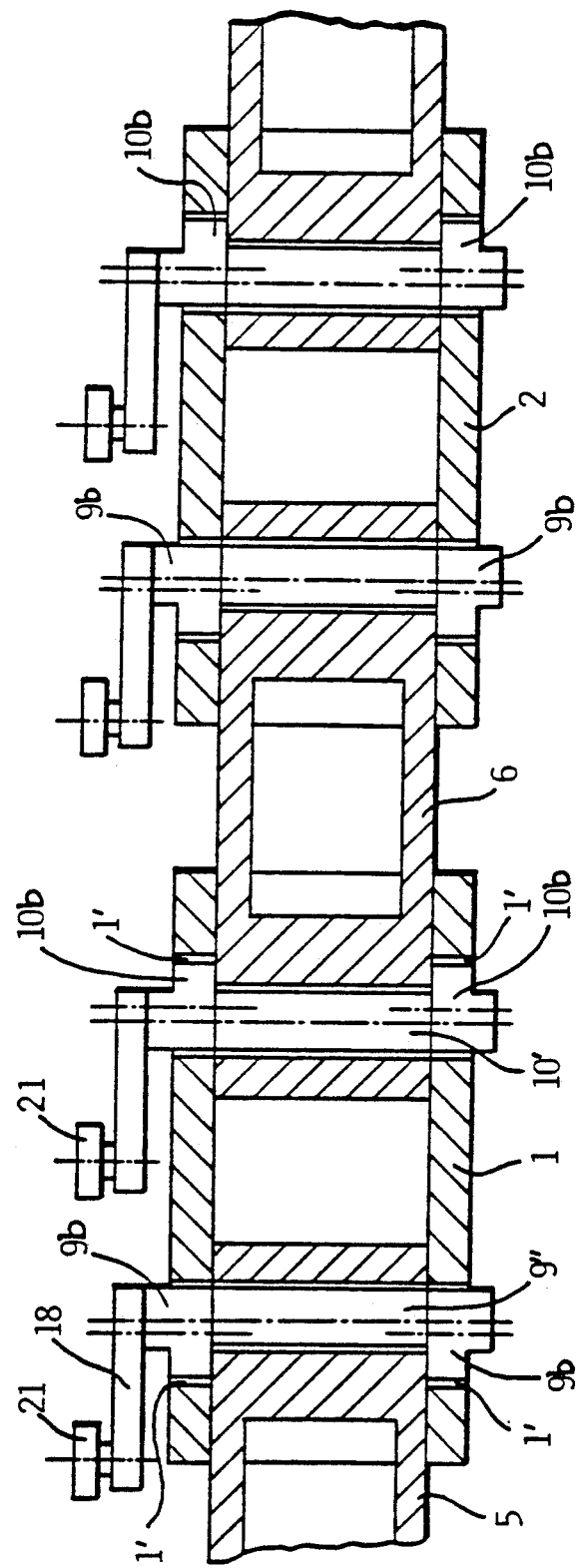
FIG. 14 is a view similar to FIG. 4, but showing an embodiment wherein each adjustable hinging bolt has two eccentric cam sections rather than only one such section.

FIG. 14 shows an embodiment in which each hinging bolt 9" and 10' has two eccentric sections 9b, 10b respectively at its ends and a circular section between the eccentric cam sections. The tenter body 1 has axially aligned holes 1' in which the eccentric cam sections 9b and 10b are received for displacing the tenter bodies 1 and 2 relative to the chain links 5, 6 for the pitch adjustment by roller controlled levers 18 as described above.

The above description relates to a single-run chain. However, the invention is equally applicable to double and multi-run chains in which two or more chain sections run in parallel to each other.

Although the invention has been described with reference to specific example embodiments it will be appreciated that it is intended to cover all modifications and equivalents within the scope of the appended claims.

What we claim is:

1. A tentering chain having an adjustable length for the treatment of a plastic film simultaneously in two axial directions, comprising a plurality of tenter bodies (1, 2) for holding said plastic film, a plurality of chain links (5, 6) for interconnecting said tenter bodies, hinging means (9, 10, 32) for operatively connecting each end of said chain links to a respective tenter body, said hinging means comprising two hinging bolts for each tenter body, at least one of said two hinging bolts comprising rotatable position adjustable eccentric means for adjusting a spacing between two neighboring tenter bodies, and adjustment means rigidly connected to said one hinging bolt for rotating said eccentric means, whereby said chain length is variable.

2. The tentering chain of claim 1, wherein said one hinging bolt comprises an eccentric section (9a, 10a) between two axially aligned circular end stubs (12) mounted for rotation in axially aligned bores in said tenter body, said eccentric section (9a, 10a) extending through a respective bore in the corresponding chain link.

3. The tentering chain of claim 1, wherein said one hinging bolt comprises two eccentric sections at its ends and a circular section between said eccentric sections, said eccentric sections being rotatably mounted for rotation in axially aligned bores in said tenter body, said circular section extending through a respective bore in the corresponding chain link.

4. The tentering chain of claim 1, wherein said adjustment means for rotating said eccentric means comprise an adjustment lever (18, 19) rigidly secured to said one hinging bolt, a guide roller (21) rotatably connected to a free end of said adjustment lever, and a movable guide rail (39) arranged for cooperation with said guide roller (21).

5. The tentering chain of claim 4, wherein each hinging bolt comprises said position adjustable eccentric means, and wherein respectively two of said adjustment levers are provided, one adjustment lever being rigidly connected to one end of one hinging bolt while the other adjustment lever is rigidly connected to the opposite end of the other hinging bolt, whereby said two adjustment levers are located in diametrically opposite positions relative to each other.

6. The tentering chain of claim 1, wherein said adjustment means comprise gear drive means for rotating the respective hinging bolt and its eccentric means.

7. The tentering chain of claim 6, wherein said adjustment means further comprise an adjustment lever, means for rotatably mounting one end of said adjustment lever to its tenter body, said gear drive means comprising a drive pinion mounted for rotation with said adjustment lever, and at least one driven pinion mounted to said one hinging bolt for meshing with said drive pinion for rotating said eccentric means of said one hinging bolt.

8. The tentering chain of claim 7, wherein two hinging bolts, each with its eccentric means, are provided for each tenter body, said adjustment means comprising two driven pinions each rigidly connected to its respective hinging bolt, and wherein both driven pinions mesh with said drive pinion for adjusting said eccentric means in synchronism with each other.

9. The tentering chain of claim 6, wherein two hinging bolts each with its eccentric means, are provided for each tenter body, said adjustment means comprising a driven pinion rigidly secured to its respective hinging bolt and a toothed rack for driving both driven pinions in synchronism with each other.

10. The tentering chain of claim 9, further comprising a guide roller (21a) rotatably connected to a free end of said toothed rack, and slanted guide rail means arranged for engaging said guide roller (21a) for moving said toothed rack (38).

11. The tentering chain of claim 10, wherein said slanted guide rail means further comprise two slanted guide rails (39a, 40) slanting in opposite directions and arranged alongside a travel path of said tentering chain one downstream of the other, so that one guide rail (39a) moves said toothed rack into engagement with said driven pinions by engaging said guide roller (21a) and so that the other guide rail (40) disengages said toothed rack from said driven pinions by engaging said guide roller (21a) when the latter has moved out of engagement with said first mentioned guide rail (39a).

12. The tentering chain of claim 11, wherein said two guide rails slant with an angle (α) relative to said travel path of said tentering chain.

13. The tentering chain of claim 12, wherein said angle (α) is within the range of 0° to 45°, said angle being the same for both guide rails.

* * * * *